(12) United States Patent
Pautis et al.

(10) Patent No.: US 12,397,899 B2
(45) Date of Patent: Aug. 26, 2025

(54) ASSEMBLY FOR AN AIRCRAFT COMPRISING A WING AND AN ENGINE PYLON FOR COUPLING A PROPULSION SYSTEM TO SAID WING

(71) Applicant: Airbus Operations SAS, Toulouse (FR)

(72) Inventors: Olivier Pautis, Toulouse (FR); Pierre-Antoine Combes, Toulouse (FR); Marc De Nicola, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/670,164

(22) Filed: May 21, 2024

(65) Prior Publication Data
US 2024/0391581 A1    Nov. 28, 2024

(30) Foreign Application Priority Data
May 23, 2023    (FR) ...................................... 2305084

(51) Int. Cl.
*B64C 3/32* (2006.01)
*B64D 27/40* (2024.01)

(52) U.S. Cl.
CPC .............. *B64C 3/32* (2013.01); *B64D 27/402* (2024.01)

(58) Field of Classification Search
CPC .......... B64C 3/32; B64D 27/40; B64D 27/402
See application file for complete search history.

(56) References Cited

U.S. PATENT DOCUMENTS

| 4,560,122 A | 12/1985 | Parkinson et al. |
| 2015/0251768 A1* | 9/2015 | Woolley ................ B64D 27/40 244/54 |
| 2016/0221682 A1 | 8/2016 | Pautis et al. |
| 2022/0127010 A1 | 4/2022 | Pautis et al. |

FOREIGN PATENT DOCUMENTS

| EP | 0115914 B1 | 1/1987 |
| EP | 3992087 A1 | 5/2022 |
| GB | 2010969 A | 7/1979 |

OTHER PUBLICATIONS

French Search Report and Written Opinion for corresponding French Patent Application No. 2305084 dated Nov. 14, 2023.

\* cited by examiner

*Primary Examiner* — Ashesh Dangol
(74) *Attorney, Agent, or Firm* — Greer, Burns & Crain, Ltd.

(57) ABSTRACT

An assembly comprising a wing with a lower surface panel and an upper surface panel and an engine pylon comprising a primary structure fixed to the wing with a fixing base. The fixing base comprises fourth fixing yokes while the primary structure bears fourth fittings, the fourth fixing yokes being secured to the fourth fittings with fourth rods.

8 Claims, 4 Drawing Sheets

ASSEMBLY FOR AN AIRCRAFT COMPRISING A WING AND AN ENGINE PYLON FOR COUPLING A PROPULSION SYSTEM TO SAID WING

CROSS-REFERENCES TO RELATED APPLICATIONS

This application claims the benefit of French Patent Application Number 2305084 filed on May 23, 2023, the entire disclosure of which is incorporated herein by way of reference.

FIELD OF THE INVENTION

The present invention relates to an assembly for an aircraft which comprises a wing and an engine pylon for coupling a propulsion system to the wing, as well as an aircraft comprising a propulsion system and such an assembly for coupling the propulsion system to the wing.

BACKGROUND OF THE INVENTION

Usually, for an aircraft, a propulsion assembly comprises, for example, a turbojet engine which is fixed to a wing of the aircraft using an engine pylon. The engine pylon is generally composed of a primary structure formed by a box composed of a top spar, a bottom spar and two lateral panels linking the two spars and internal ribs distributed along the box.

The turbojet engine is fixed under the engine pylon by means of engine attachments which conventionally comprise, at the front, a front engine attachment, at the rear, a rear engine attachment, and, between the front and rear engine attachments, a thrust force absorption assembly comprising absorption rods fixed between the turbojet engine and the primary structure of the pylon to absorb the thrust forces generated by the turbojet engine.

The engine pylon is also fixed to the structure of the wing using a fixing base. More specifically, the fixing base has a substantially inverted U form and is intended to receive the rear end of the box. The base also bears the attachments of the engine pylon to secure the latter to the structure of the wing using fittings through which the forces originating from the turbojet engine pass to the structure of the wing.

Although the current installations are satisfactory, the size of turbojet engines is increasing but it is not preferable to modify the dimensions of the landing gear so as to modify the height of the wing with respect to the ground for reasons of weight and bulk penalties. Now, the box has relatively significant dimensions which make the positioning of the turbojet engine under the wing difficult.

It is therefore necessary to provide a solution that ensures an optimal installation of the turbojet engines under the wings of the aircraft.

SUMMARY OF THE INVENTION

One object of the present invention is to propose an assembly for an aircraft comprising a wing and an engine pylon for coupling a propulsion system to the wing and which comprises means for fixing to the wing which make it possible to reduce the bulk of the engine pylon while ensuring an optimized transfer of the forces to the structure of the wing.

To this end an assembly for mounting, on an aircraft, a propulsion system having a vertical median plane is proposed, comprising:

a wing with a front spar, an upper surface panel fixed in the top part of said front spar and a lower surface panel fixed in the bottom part of said front spar, in which the front spar bears a first fitting at the vertical median plane, in which the lower surface panel bears two starboard and port fittings at a bottom part of said front spar, and in which the lower surface bears a third fitting positioned at the rear of the second starboard and port fittings, an engine pylon comprising a primary structure, a shackle fixed by a fifth link to said third fitting of said lower surface, said fifth link having at least one degree of freedom in rotation, a first and a second rod, in which a first end of each first and second rod is fixed to the shackle respectively by a third and a fourth pivot link, a third rod, in which a first end is fixed to the first fitting by a seventh link, said seventh link having at least one degree of freedom in rotation, and a fixing base comprising a body secured to a rear part of the primary structure.

Said body comprises two first starboard and port fixing yokes extending to the rear and in the top part on the sides of said fixing base, each of said first fixing yokes being fixed to one of said second fittings by a first pivot link.

Said body also comprises two second starboard and port fixing yokes extending to the rear and in the bottom part on the sides of said fixing base, each of said two second fixing yokes being fixed by a second link to a second end respectively of the first and second rods. Said second link has at least one degree of freedom in rotation.

Said body further comprises at least one central third fixing yoke extending to the rear and at the vertical median plane, said central third fixing yoke being fixed to a second end of said third rod by a sixth link, said sixth link having at least one degree of freedom in rotation.

According to the invention, the assembly comprises a fourth starboard fitting and a fourth port fitting, each of said fourth fittings being fixed to the primary structure of the engine pylon. For each fourth fitting, the assembly comprises a fourth rod, a first end of which is fixed to said fourth fitting by an eighth pivot link.

Furthermore, said body comprises two fourth starboard and port fixing yokes extending to the front and in the bottom part on the sides of said fixing base, each of said fourth fixing yokes being fixed to a second end of a fourth rod by a ninth pivot link.

With such an engine pylon, the forces from the engine which are conveyed by the primary structure of the pylon are transmitted directly to the upper surface and lower surface panels via the fixing base. In addition, the implementation of the fourth rods linking the primary structure of the engine pylon to the fixing base makes it possible to reduce the dimensions of the primary structure of the engine pylon, thus allowing and facilitating the fixing of a turbojet engine of greater dimensions to the wing of the aircraft.

Advantageously, said primary structure comprises a top spar, a bottom spar and two starboard and port lateral panels linking the two spars, said fourth fittings being fixed on either side of said primary structure in the bottom part of said lateral panels.

According to a particular aspect, said body comprises a first body part in the form of an inverted U extending inside a second body part in inverted U form, in which the rear part of the primary structure is fixed in the first body part, and in which the two first fixing yokes, the two second fixing yokes and the two fourth fixing yokes are secured to the second body part.

According to another particular aspect, said first body part extends inside said second body part, said first body part and said second body part extending in a same plane, parallel to the vertical plane.

According to yet another particular aspect, said body comprises at least one reinforcing rib linking said first body part and said second body part.

According to a particular aspect, said rear part of the primary structure secured to said fixing base has a height measured in the vertical direction between said top and bottom spars and a width measured in the transverse direction between said lateral panels, and said fixing base has a height measured between the orthogonal projection of an axis of a second link of said second fixing yoke and an axis of a sixth link of said third fixing yoke and a width measured in the transverse direction between said two first fixing yokes, the height of said primary structure being less than the height of said fixing base and the width of said primary structure being less than the width of said fixing base.

According to a particular aspect, said first body part of said fixing base comprises a first port protuberance and a first starboard protuberance extending vertically in a plane that is overall at right angles to the vertical median plane, said first protuberances being disposed on either side of said primary structure in the top part of said lateral panels. For the first port protuberance, the assembly comprises a first link, a first end of which is fixed to said first protuberance by a tenth pivot link. For the first starboard protuberance, the assembly comprises a second link, a first end of which is fixed to said first starboard protuberance by an eleventh pivot link. Said second port and starboard fittings respectively comprise a second port protuberance and a second starboard protuberance extending vertically in a plane that is overall at right angles to the vertical median plane, said second protuberances extending in the bottom part of the second fittings, the second starboard protuberance being fixed to a second end of said first link by an eleventh pivot link and said second port protuberance being fixed to a second end of said second link by an eleventh pivot link.

According to another particular aspect, said tenth and eleventh pivot links have a fitted link axis and at least one of said twelfth and thirteenth pivot links has a link axis comprising a play.

According to a particular aspect, said second, fourth, fifth and sixth links are pivot links or ball joint links.

The invention also proposes an aircraft comprising a propulsion system and an assembly as described previously, in which the propulsion system is fixed to the engine pylon.

BRIEF DESCRIPTION OF THE DRAWINGS

The features of the invention mentioned above, as well as others, will become more clearly apparent on reading the following description of an exemplary embodiment, said description being given in relation to the attached drawings, in which.

DETAILED DESCRIPTION OF THE PREFERRED EMBODIMENTS

Figure 1:
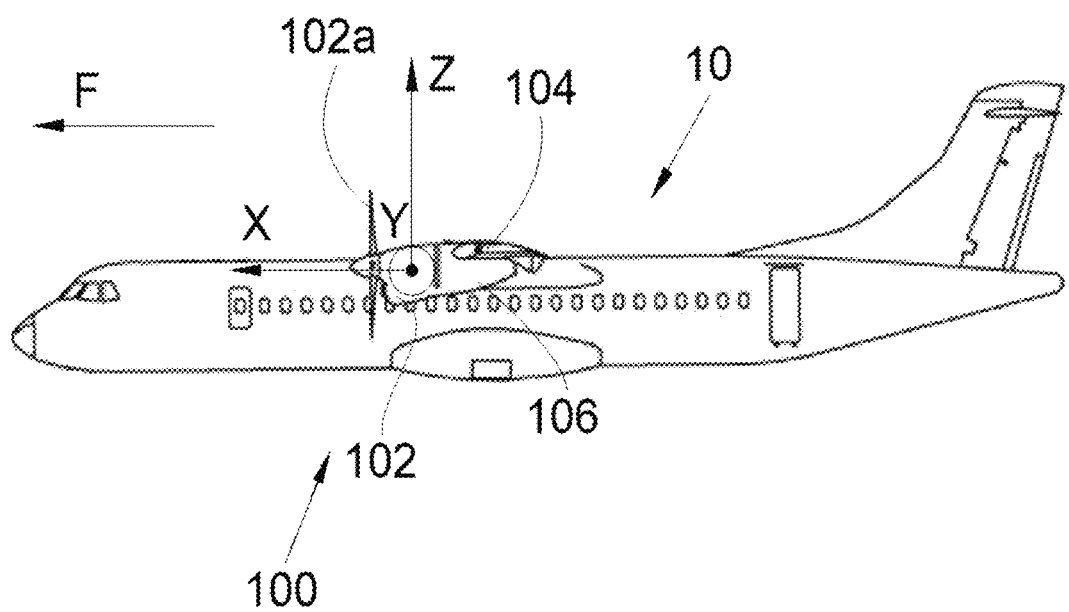
FIG. 1 is a side view of an aircraft according to the invention.

FIG. 1 shows an aircraft 10 which comprises a propulsion system 102, for example of turbojet or turboprop engine type. The propulsion system 102 is linked to a wing 104 of the aircraft 10 via an engine pylon 106. The wing 104 and the engine pylon 106 form an assembly 100 according to the invention and the propulsion system 102 is fixed to the engine pylon 106 by any appropriate fixing means known to the person skilled in the art such as those disclosed in the document US-A-2016/0221682.

In the following description, the terms relating to a position are taken with reference to an aircraft in normal flight position, that is to say as is represented in FIG. 1 and the "front" and "rear" positions are taken with respect to the front and the rear of the propulsion system 102 and with respect to the direction of advance F of the aircraft 10 when the propulsion system 102 is operating.

In the following description, and by convention, X denotes the longitudinal direction of the propulsion system which is horizontal when the aircraft is on the ground, Y denotes the transverse direction which is horizontal when the aircraft is on the ground, and Z denotes the vertical direction which is vertical when the aircraft is on the ground, these three directions X, Y and Z being mutually orthogonal.

The engine pylon 106 and the propulsion system 102 have a vertical median plane XZ and the propulsion system 102 is, here, a turboprop engine with a propeller 102a, but it could be of the turbofan engine type with a nacelle.

Figure 2:
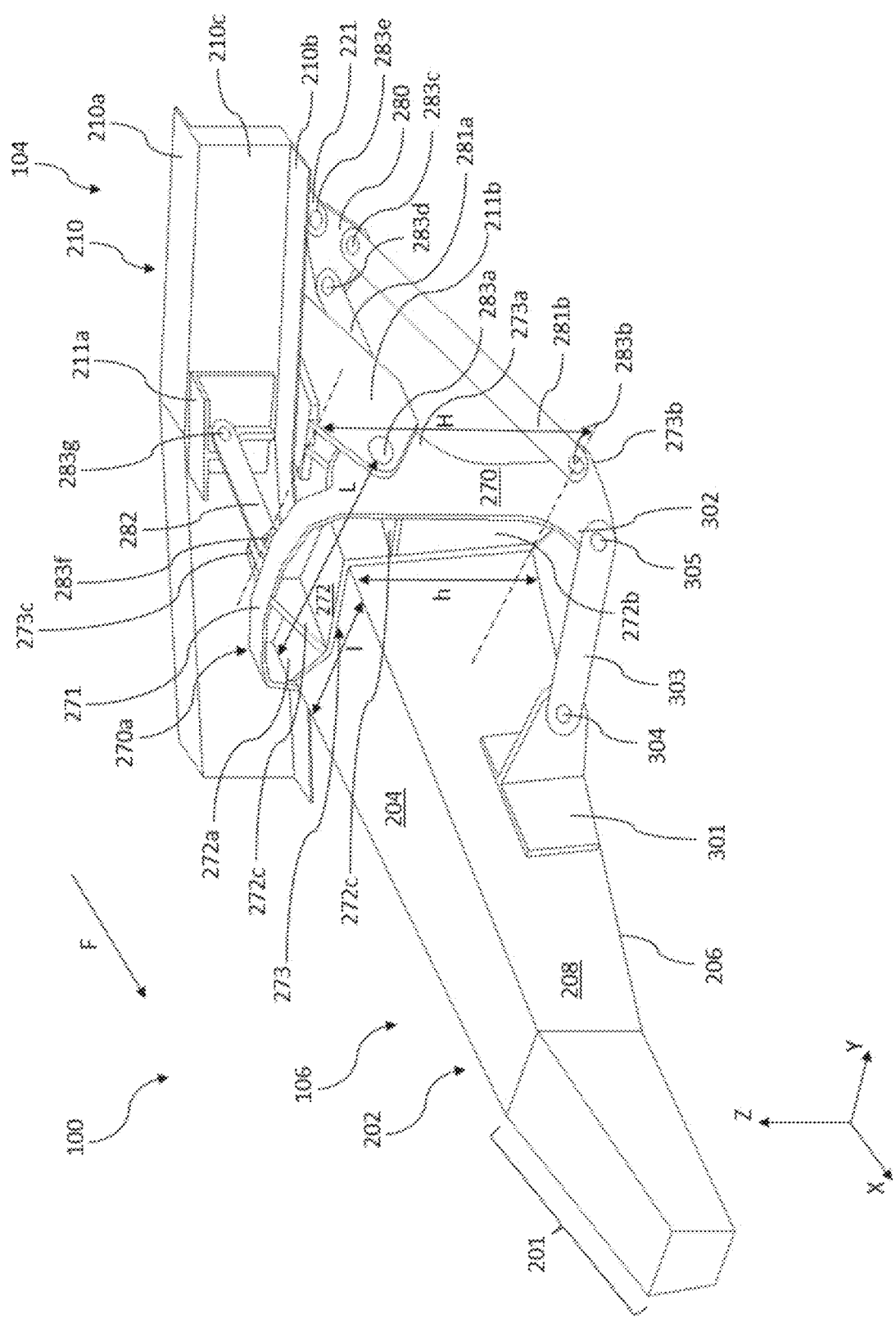
FIG. 2 is a perspective view of an assembly according to an embodiment of the invention.
Figure 3:
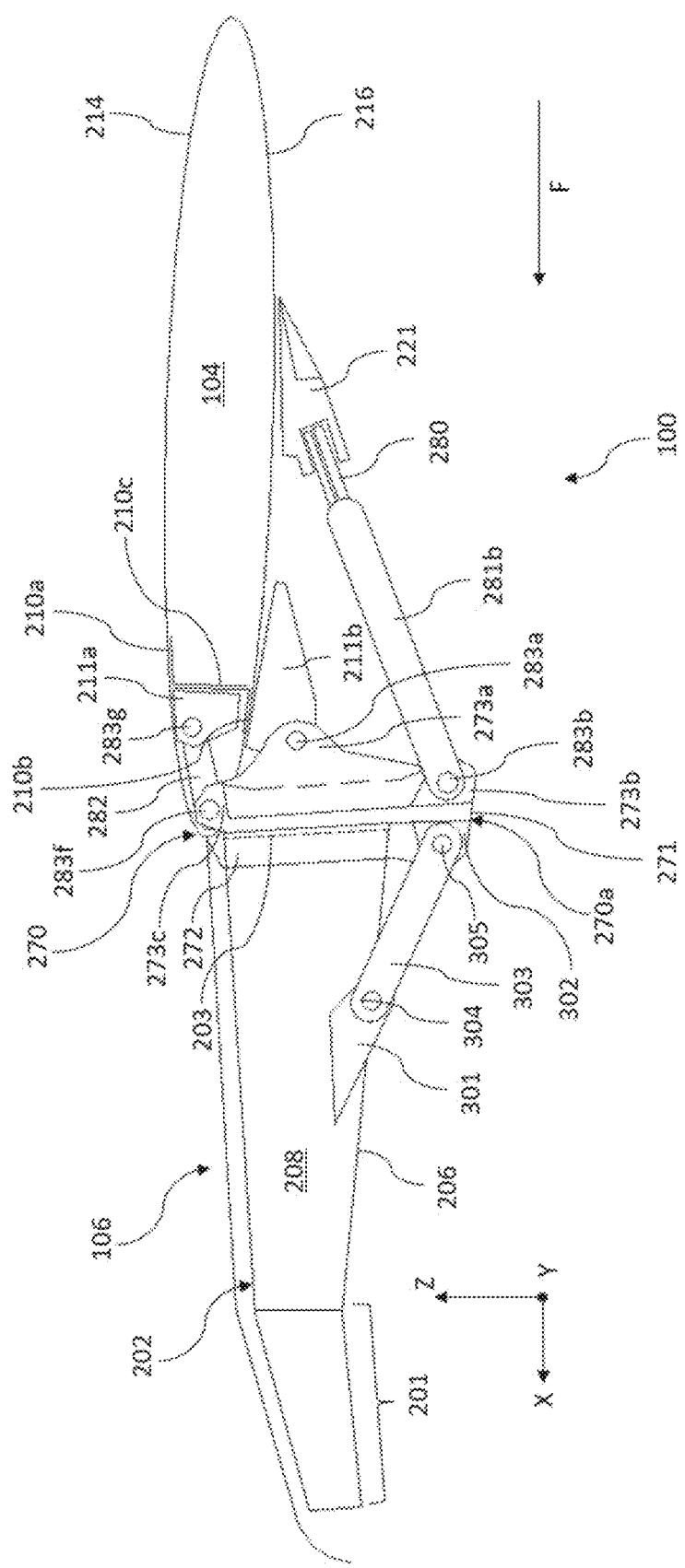
FIG. 3 is a side view of FIG. 2.

FIG. 2 shows the assembly 100 according to the invention. The engine pylon 106 comprises a rigid structure forming a box and also called primary structure 202. The primary structure 202 is formed by a top spar 204, a bottom spar 206 and two starboard and port lateral panels 208 (only the port panel is represented in FIGS. 2 and 3) linking the two spars 204 and 206.

The form of the primary structure 202 is, in this example, configured so that the engine pylon 106 represents a front pyramid 201, situated at the front end of the engine pylon 106 in the direction of advance F, and a base 203, substantially rectangular, situated at the rear end of the engine pylon 106 in the direction of advance F. The base 203 has a height h measured substantially in the vertical direction Z between the top 204 and bottom 206 spars and a width 1 measured substantially in the transverse direction Y between the two lateral panels 208.

The structure of the wing 104 comprises a front spar 210, an upper surface panel 214 and a lower surface panel 216 which are both fixed to the front spar 210 and extend overall in horizontal planes XY.

Obviously, to ensure the rigidity of the wing, its structure comprises other elements such as ribs which are distributed between the upper surface panel 214 and the lower surface panel 216.

The front spar 210 here takes the form of a profile in the form of a reversed Z-shaped tread in FIGS. 2 and 3, with a top wing 210a (also called top part) and a bottom wing 210b (also called bottom part) which are overall horizontal and a central part 210c that is overall at right angles to the median plane extending overall vertically parallel to the plane YZ. The upper surface panel 214 is fixed on top of the top wing 210a of the spar 210 and the lower surface panel 216 is fixed under the bottom wing 210b of the spar 210. The fixing of the front spar 210 to the panels 214 and 216 is done by any appropriate means such as welds, bolts, et cetera. The upper surface panel 214 is thus fixed in the top part of the front spar 210 and the lower surface panel 216 is fixed in the bottom part of the front spar 210. The central part 210c is level with the leading edge of the wing 104.

Figure 4:
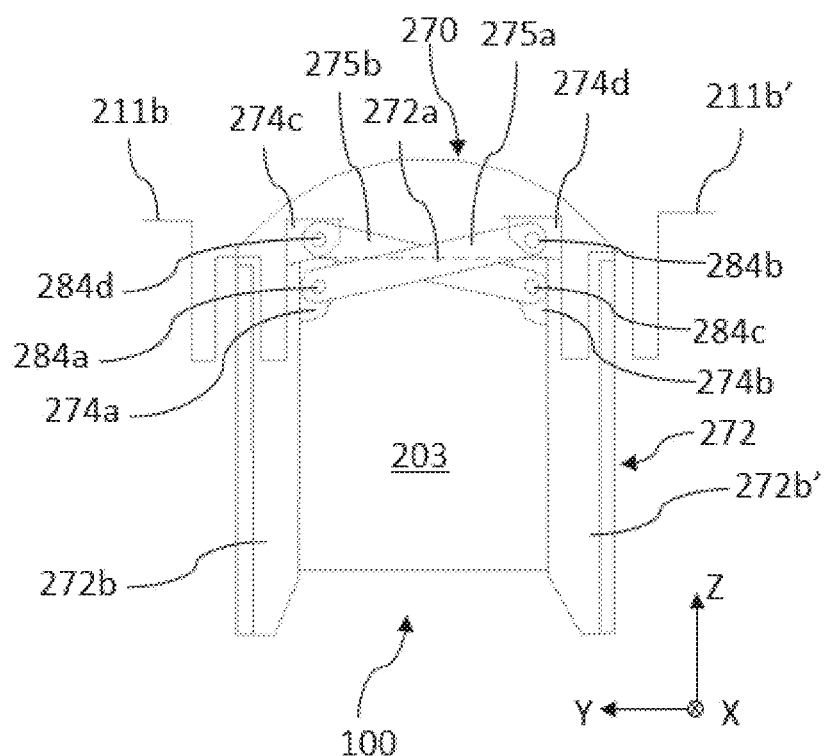
FIG. 4 is a rear view partially illustrating the assembly of FIGS. 2 and 3.

So as to allow the fixing of the engine pylon 106 to the wing 104, the front spar 210 bears a first fitting 211a fixed at the vertical median plane XZ, and more particularly here at the central part 210c of the front spar 210. The lower surface panel 216 bears two second starboard 211b' and port 211b fittings (only the second port fitting is represented in FIGS. 2 and 3, the second starboard fitting is represented in FIG. 4) which are fixed onto the outer face of the lower surface panel 216 and in the alignment of the bottom part 210b of the front spar 210. In addition, the lower surface panel 216 also bears a third fitting 221 (visible in FIG. 3), which is, in this example, fixed under the lower surface 216, substantially at the lowest part of the lower surface 216. In this example, the third fitting 221 is positioned at the rear of the second starboard 211b' and port 211b fittings.

The assembly 100 further comprises a fixing base 270 secured to the rear part of the primary structure 202. The fixing base 270 comprises, in this example, a body 270a extending vertically in the plane YZ. More specifically, the body 270a has a first body part 272 that takes the form of an inverted U and a second body part 271 that also takes the form of an inverted U. The first body part 272 and the second body part 271 extend in a vertical plane parallel to the vertical plane YZ and the first body part 272 is arranged inside the second body part 271.

In the example illustrated, the first body part 272 comprises a central top wall 272a extending horizontally in a plane parallel to the plane XY. The first body part 272 also comprises two starboard 272b' and port 272b lateral walls (only the port lateral wall is represented in FIGS. 2 and 3, the starboard lateral wall is visible in FIG. 4) which extend at right angles from the central top wall 272a and which extend vertically in planes parallel to the vertical median plane XZ. The central top wall 272a and the starboard 272b' and port 272b lateral walls are secured and extend around and above the rear part of the primary structure 202 and form a housing 273 for receiving the base 203 of the primary structure 202. The dimensions of the housing 273 are clearly chosen to match the dimensions of the base 203 of the primary structure 202. It is understood that the primary structure 202 is fixed to the housing 273 by any appropriate means such as welds, bolts, et cetera.

The fixing base 270 comprises at least one reinforcing rib 272c linking the walls 272a, 272b, 272b' of the first body part 272 to the second body part 271. In this example, three ribs 272c are implemented (only two ribs are visible in FIG. 2) and extend respectively from the top central wall 272a and starboard 272b' and port 272b lateral walls to the second body part 271. These reinforcing ribs 272c notably allow the fixing base 270 to withstand and transmit the forces originating from the propulsion system 102 to the wing 104. The ribs 272c fix together the walls 272a, 272b, 272b' of the first body part 272 to the walls of the second body part 271.

So as to allow the engine pylon 106 to be fixed to the wing 104, the second body part 271 of the body 270a of the fixing base 270 comprises two first starboard and port fixing yokes 273a (only the first port fixing yoke is represented in FIGS. 2 and 3) which extend from the second body part 271 of the body 270a to the rear and which are disposed in the top part on the sides of the fixing base 270. Each of the first fixing yokes 273a is secured to one of the second fittings 211b, 211b' by a first pivot link 283a, in particular a sliding pivot link.

In this example, the first fixing yokes 273a and the second fittings 211b, 211b' each comprise a bore into which a shaft is threaded to form a first pivot link 283a. This first pivot link 283a has an axis of rotation that is substantially horizontal which extends overall parallel to the transverse direction Y.

The second body part 271 of the body 270a of the fixing base 270 also comprises two second starboard and port fixing yokes 273b (only the second port fixing yoke is represented in FIGS. 2 and 3) which extend from the second body part 271 of the body 270a to the rear and which are disposed in the bottom part on the sides of the fixing base 270. The two second fixing yokes 273b are secured to a shackle 280 which can be triangular, respectively by a first and a second rod 281a, 281b.

In this example, the second starboard fixing yoke is fixed to a second end of the first rod 281a via a second link 283b, while the second port fixing yoke 273b is fixed to a second end of the second rod 281b via another second link 283b. The second link 283b has at least one degree of freedom in rotation on an axis extending here substantially parallel to the transverse direction Y. In this example, the second link 283b is a pivot link, the axis of which extends overall parallel to the transverse direction Y.

In a variant that is not illustrated, it would be possible to envisage replacing the second pivot link 283b with a ball joint link.

The first ends of the first 281a and second 281b rods are respectively fixed to the shackle 280 by a third 283c and a fourth 283d pivot link. The axis of the third 283c and fourth 283d pivot links extends overall parallel to the direction at right angles to the plane passing through the axes of the first and second rods 281a, 281b. In this example, the first ends of each of the two first and second rods 281a, 281b and the shackle 280 comprise bores into which shafts are threaded to form said third 283c and fourth 283d pivot links.

Furthermore, the shackle 280 is fixed by a fifth link 283e to the third fitting 221 of the lower surface 216. The fifth link 283e has at least one degree of freedom in rotation on an axis extending here substantially parallel to the vertical direction Z. In this example, the fifth link 283e is a pivot link, the axis of which extends overall parallel to the direction at right angles to the plane passing through the axes of the first and second rods 281a, 281b. For this, the shackle 280 and the third fitting 221 each have a bore into which a shaft is threaded to form the fifth pivot link 283e.

In a variant that is not illustrated, it would be possible to envisage replacing the fifth pivot link 283e with a ball joint link.

The second body part 271 of the body 270a of the fixing base 270 also comprises at least one third central fixing yoke 273c (only one in the example illustrated) which extends from the second body part 271 of the body 270a to the rear and which is disposed substantially centrally (that is to say at the vertical median plane XZ) in the top part of the fixing base 270.

The third central fixing yoke 273c is fixed to the first fitting 211a by a third rod 282. More specifically, a first end of the third rod 282 is fixed to the first fitting 211a by a seventh link 283g and the second end of the third rod 282 is fixed to the third central fixing yoke 273c by a sixth link 283f. The sixth 283f and seventh 283g links have at least one degree of freedom in rotation on an axis extending here substantially parallel to the transverse direction Y. In this example, the sixth 283f and seventh 283g links are pivot links, the axis of which extends overall parallel to the transverse direction Y.

For this, the third rod 282 comprises a bore at each of its ends into each of which a shaft is threaded and cooperates respectively with a bore formed in the third central fixing yoke 273c and in the first fitting 211a to form the sixth 283f and seventh 283g pivot links.

In a variant that is not illustrated, it would be possible to envisage replacing the sixth 283f and seventh 283g pivot links with ball joint links.

According to the invention, the primary structure 202 bears a fourth starboard fitting and a fourth port fitting 301 (only the fourth port fitting is visible in FIGS. 2 and 3). The fourth fittings 301 are fixed on either side of the primary structure 202. In this example, the fourth starboard fitting is fixed to the starboard lateral panel and the fourth port fitting 301 is fixed to the port lateral panel 208. Preferably, and as illustrated in FIGS. 2 and 3, the fourth fittings 301 are fixed in the lower part of the lateral panels 208 so as to optimize the transmission of the forces originating from the propulsion system 102 and passing through the engine pylon 106 to the wing 104.

The second body part 271 of the body 270a of the fixing base 270 further comprises two fourth starboard and port fixing yokes 302 extending to the front and in the top part on the sides of said fixing base 270. Each of the fourth fixing yokes 302 is fixed to a second end of a fourth rod 303 by a ninth pivot link 305. The second end of each fourth rod 303 is fixed to a fourth fitting 301 by an eighth pivot link 304.

The axis of the eighth 304 and ninth 305 pivot links is overall parallel to the transverse direction Y.

The implementation of the fourth fittings 301, of the fourth fixing yokes 302 and of the fourth rods 303 makes it possible to reduce the dimensions of the primary structure 202 of the engine pylon 106 while ensuring an optimized transfer of the forces originating from the propulsion system 102 to the structure of the wing 104 through these additional force paths. Consequently, the reduction of the dimensions of the primary structure 202 of the engine pylon 106 allows and facilitates the installation and the fixing of propulsion systems of dimensions greater than the turbojet engines currently fixed to the wing of the aircraft.

As illustrated in FIG. 4, which partially represents the assembly according to a rear view, the assembly 100 further comprises a set of two links 275a, 275b making it possible to react to the forces originating from the propulsion system 102 essentially in the transverse direction Y. In this example, the fixing base 270 comprises, at the first body part 272, a first port protuberance 274a and a first starboard protuberance 274b. In this example, each first protuberance 274a, 274b has an ear form and extends vertically and at right angles to the lateral walls 272b, 272b', that is to say in a plane at right angles to the vertical median plane XZ. More specifically, the first port protuberance 274a extends substantially in the corner between the central top wall 272a and the port lateral panel 208 of the primary structure 202 and the first starboard protuberance 274b extends substantially in the corner between the central top wall 272a and the starboard lateral panel 208 of the primary structure 202. The first protuberances 274a, 274b are disposed in the top part and in the rear part of the fixing base 270, that is say at the rear of the primary structure 202.

The second port 211b and starboard 211b' fittings respectively bear a second port protuberance 274c and a second starboard protuberance 274d. In this example, each second protuberance 274c, 274d also has an ear form and extends vertically in a plane at right angles to the vertical median plane XZ. In this example, the second protuberances 274c, 274d extend in the bottom part of the second fittings 211b, 211b'.

In this example, the first protuberances 274a 274b face one another. Likewise, the second protuberances 274c and 274d also face one another. The set of links 275a, 275b cross-links the second fittings 211b, 211b' to the fixing base 270. More specifically, a first link 275a links the first port protuberance 274a to the second starboard protuberance 274d while the second link 275b links the first starboard protuberance 274b to the second port protuberance 274c. The first 275a and second 275b links are therefore crossed and extend substantially in two parallel planes at right angles to the vertical median plane XZ. The two parallel planes are slightly spaced apart to favour the crossing of the first 275a and second 275b links.

The ends of the first link 275a are secured to the first port protuberance 274a and to the second starboard protuberance 274d respectively by a tenth 284a and an eleventh 284b pivot link. The ends of the second link 275b are secured to the first starboard protuberance 274b and to the second port protuberance 274c respectively by a twelfth 284c and a thirteenth 284d pivot link.

More specifically, the first link 275a is said to be "engaged" whereas the second link 275b is said to be "on standby". That means that the link axes of the tenth 284a and eleventh 284b pivot links are fitted and therefore react to the forces under stress, such that the first link 275a represents the so-called "main" force path for the transmission of the forces having a component that is substantially oriented in the transverse direction Y.

At least one of the twelfth 284c and thirteenth 284d pivot links has a play which makes it possible, should the first link 275a break, to engage the second link 275b such that it is the second link 275b which reacts to the forces having a component substantially oriented in the transverse direction Y. The second link 275b thus represents the so-called "secondary" force path.

For example, the twelfth 284c and thirteenth 284d pivot links each have a link axis borne respectively by the first starboard protuberance 274b and by the second port protuberance 274c. At least one of the bores formed at the ends of the second link 275b and cooperating with these link axes has, for example, an oblong form such that the second link 275b is mounted with a play at at least one of the twelfth 284c and thirteenth 284d pivot links.

The particular implementation of this set of links 275a, 275b also makes it possible to reduce the dimensions of the primary structure 202 of the engine pylon 106 while ensuring an optimized transfer of the forces originating from the propulsion system 102 to the structure of the wing 104.

The fixing base 270 has a height H which is measured between the orthogonal projection of the axis of the second fixing yoke 273b and the axis of the third fixing yoke 273c (that is to say vertically in the vertical direction Z) while the width L is measured horizontally (that is to say in the transverse direction Y) between the two first fixing yokes 273a.

Preferably, and in order to compensate for the lower inertia of the assembly 100, the height h of the primary structure 202 is less than the height H of the fixing base 270 and the width l of the primary structure 202 is less than the width L of the fixing base 270.

This way, the draining of the forces passing through the primary structure 202 to the fixing base 270 and the associated rods/shackles is optimized. Indeed, the implementation of a width L of the fixing base 270 greater than the width l of the primary structure 202 favours the absorption of the moment about the vertical axis Z. Likewise, with the height H of the fixing base 270 being greater than the height h of the primary structure 202, the points governing the moments about the lateral axis Y are further apart. These two conditions make it possible to optimize the lever arms engaged in the absorption of the moments. This disposition therefore ensures, locally, an inertia greater than that of the primary structure 202, thus making it possible to limit the dimensions of the primary structure 202.

It is thus possible to propose a primary structure 202 that has a lesser bulk than the primary structures of the prior art solutions.

The primary structure 202 does however have standard dimensions at the front pyramid 201 of the primary structure 202 so as to ensure the compatibility of the assembly 100 to the fixing of propulsion systems currently implemented.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

Claimed is:

1. An assembly for mounting, on an aircraft, a propulsion system having a vertical median plane, said assembly comprising:
    a wing with a front spar, an upper surface panel fixed in a top part of said front spar and a lower surface panel fixed in a bottom part of said front spar, wherein the front spar bears a first fitting at a vertical median plane, wherein said lower surface panel bears two second fittings, a second starboard fitting and a second port fitting, at the bottom part of said front spar, and wherein the lower surface panel bears a third fitting positioned at a rear of said second starboard and port fittings;
    an engine pylon comprising a primary structure;
    a shackle fixed by a fifth link to the third fitting of said lower surface panel, said fifth link having at least one degree of freedom in rotation;
    a first rod and a second rod, wherein a first end of each first rod and second rod is fixed to the shackle respectively by a third pivot link and a fourth pivot link;
    a third rod, wherein a first end of the third rod is fixed to the first fitting by a seventh link, said seventh link having at least one degree of freedom in rotation;
    a fixing base comprising a body secured to a rear part of the primary structure,
        said body comprising two first fixing yokes, a first starboard fixing yoke and a first port fixing yoke, extending to a rear and in a top part on sides of said fixing base, each of said first fixing yokes being fixed to one of said two second fittings by a first pivot link,
        said body further comprising two second fixing yokes, a second starboard fixing yoke and a second port fixing yoke, extending to the rear and in a bottom part on the sides of said fixing base, each of said two second fixing yokes being fixed by a second link to a second end respectively of the first and of the second rods, said second link having at least one degree of freedom in rotation,
        said body comprising at least one third central fixing yoke extending to the rear and at the vertical median plane, said at least one third central fixing yoke being fixed to a second end of said third rod by a sixth link, said sixth link having at least one degree of freedom in rotation;
    a fourth starboard fitting and a fourth port fitting, each of said fourth fittings being fixed to the primary structure of said engine pylon; and,
    two fourth rods, wherein a first end of each fourth rod is fixed to said respective fourth fitting by an eighth pivot link,
    wherein said body further comprises two fourth fixing yokes, a fourth starboard fixing yoke and a fourth port fixing yoke, extending to a front and in the bottom part on the sides of said fixing base, each of said fourth fixing yokes being fixed to a second end of one of the two fourth rods by a ninth pivot link, and,
    wherein said body comprises a first body part in a form of an inverted U extending inside a second body part having an inverted U form as well,
    wherein the rear part of the primary structure is fixed in the first body part, and
    wherein the two first fixing yokes, the two second fixing yokes, and the two fourth fixing yokes are secured to the second body part.

2. The assembly according to claim 1, wherein said primary structure comprises a top spar, a bottom spar, and two lateral panels, a starboard lateral panel and a port lateral panel, linking the top and bottom spars, said fourth fittings being fixed on either side of said primary structure in a bottom part of said lateral panels.

3. The assembly according to claim 1, wherein said body comprises at least one reinforcing rib linking said first body part and said second body part.

4. The assembly according to claim 2, wherein said rear part of the primary structure secured to said fixing base has a height (h) measured in a vertical direction (Z) between said top and bottom spars and a width (l) measured in a transverse direction (Y) between said lateral panels, and
    wherein said fixing base has a height (H) measured between an orthogonal projection of an axis of the second link of said second fixing yoke and an axis of the sixth link of said third fixing yoke and a width (L) measured in the transverse direction (Y) between said two first fixing yokes, the height (h) of said primary structure being less than the height (H) of said fixing base and the width (l) of said primary structure being less than the width (L) of said fixing base.

5. The assembly according to claim 2, wherein said first body part of said fixing base comprises a first port protuberance and a first starboard protuberance extending vertically in a plane that is at right angle to the vertical median plane, said first port and starboard protuberances being disposed on either side of said primary structure in a top part of said lateral panels,
    wherein, for the first port protuberance, the assembly comprises a fifth rod, a first end of which is fixed to said first port protuberance by a tenth pivot link, wherein, for the first starboard protuberance, the assembly comprises a sixth rod, a first end of which is fixed to said first starboard protuberance by an eleventh pivot link, and wherein said second port and starboard fittings respectively comprise a second port protuberance and a second starboard protuberance extending vertically in a plane that is at right angle to the vertical median plane, said second port and starboard protuberances extending in a bottom part of the second fittings, the second starboard protuberance fixed to a second end of said fifth rod by a twelfth pivot link, and said second port protuberance fixed to a second end of said sixth rod by a thirteenth pivot link.

6. The assembly according to claim 5, wherein said tenth and eleventh pivot links each has a fixed link axis, and wherein at least one of said twelfth and thirteenth pivot links has a play.

7. The assembly according to claim 1, wherein said second, fifth, sixth and seventh links are pivot links or ball joint links.

8. An aircraft comprising:

a propulsion system, and the assembly according to claim 1, wherein the propulsion system is fixed to the engine pylon.

* * * * *